United States Patent
Griffith et al.

(10) Patent No.: US 8,160,573 B2
(45) Date of Patent: *Apr. 17, 2012

(54) PORTABLE COMMUNICATIONS DEVICE COUPLED TO FIRST NETWORK BY WAY OF SECOND NETWORK

(75) Inventors: Greg Griffith, Atlanta, GA (US);
Charles M. Link, II, Roswell, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/510,714

(22) Filed: Jul. 28, 2009

(65) Prior Publication Data

US 2009/0286533 A1    Nov. 19, 2009

Related U.S. Application Data

(63) Continuation of application No. 11/613,231, filed on Dec. 20, 2006, now Pat. No. 7,567,801, which is a continuation of application No. 11/027,233, filed on Dec. 30, 2004, now Pat. No. 7,209,738, which is a continuation of application No. 09/473,604, filed on Dec. 29, 1999, now Pat. No. 6,898,427.

(51) Int. Cl.
*H04Q 7/20* (2006.01)

(52) U.S. Cl. .................. 455/426.1; 455/557; 455/556.1; 455/575.6; 455/421; 340/7.21; 340/7.27; 340/7.29

(58) Field of Classification Search ............ 455/426.1, 455/556.1, 557, 575.6, 556, 421
See application file for complete search history.

(56) References Cited

U.S. PATENT DOCUMENTS

| | | | | |
|---|---|---|---|---|
| 5,497,339 A | * | 3/1996 | Bernard | 708/109 |
| 5,533,097 A | * | 7/1996 | Crane et al. | 455/552.1 |
| 5,541,976 A | * | 7/1996 | Ghisler | 455/426.1 |
| 5,581,366 A | * | 12/1996 | Merchant et al. | 358/400 |
| 5,666,530 A | * | 9/1997 | Clark et al. | 1/1 |
| 5,884,188 A | * | 3/1999 | Hayes, Jr. | 455/552.1 |
| 5,900,875 A | * | 5/1999 | Haitani et al. | 715/840 |
| 6,021,310 A | * | 2/2000 | Thorne | 340/7.54 |
| 6,097,308 A | * | 8/2000 | Albert et al. | 340/7.54 |
| 6,208,870 B1 | * | 3/2001 | Lorello et al. | 455/466 |
| 6,324,380 B1 | * | 11/2001 | Kiuchi et al. | 455/12.1 |
| 6,696,922 B1 | * | 2/2004 | Wong et al. | 340/7.32 |
| 6,898,427 B1 | * | 5/2005 | Griffith et al. | 455/426.1 |
| 6,917,280 B1 | * | 7/2005 | Griffith et al. | 340/7.29 |
| 7,183,898 B2 | * | 2/2007 | Griffith et al. | 340/7.29 |
| 7,209,738 B2 | * | 4/2007 | Griffith et al. | 455/426.1 |
| 7,567,801 B2 | * | 7/2009 | Griffith et al. | 455/426.1 |

* cited by examiner

*Primary Examiner* — Marceau Milord
(74) *Attorney, Agent, or Firm* — Moazzam & Associates, LLC

(57) ABSTRACT

A portable communications device (PCD) is coupled to a first network by way of a second network. The PCD is normally in radio communication with the first network, and is coupled to the first network by way of the second network when the PCD is out of radio communication with the first network. In particular, the PCD is coupled to the second network, and is caused to leave a first network mode and enter a second network mode. A network connection is established with the first network by way of the second network, and communication with the first network is entered into by way of the second network.

17 Claims, 3 Drawing Sheets

PORTABLE COMMUNICATIONS DEVICE COUPLED TO FIRST NETWORK BY WAY OF SECOND NETWORK

CROSS-REFERENCE TO RELATED APPLICATION

This application is a continuation of U.S. patent application Ser. No. 11/613,231, filed Dec. 20, 2006, now U.S. Pat. No. 7,567,801, which is a continuation of U.S. patent application Ser. No. 11/027,233, filed Dec. 30, 2004, now U.S. Pat. No. 7,209,738, which is a continuation of U.S. patent application Ser. No. 09/473,604, filed Dec. 29, 1999, now U.S. Pat. No. 6,898,427, all of which are incorporated by reference herein in their entirety.

FIELD OF THE INVENTION

The present invention relates to a method and apparatus for extending coverage for a portable communications device such as an interactive (two-way) communications device. In particular, the present invention relates to extending coverage for a two-way pager in areas where the pager cannot transmit to a receiving station and/or receive from a transmitting station.

BACKGROUND OF THE INVENTION

Interactive two-way pagers and a pager network system in support thereof are known. Examples of such two-way pagers include the RESEARCH IN MOTION (RIM) "BLACK-BERRY" two-way pager designed and/or marketed by RESEARCH IN MOTION Limited of Waterloo, Ontario, Canada and the MOTOROLA two-way pager designed and/or marketed by MOTOROLA Corporation of Schaumberg, Ill., USA. Such pagers typically include a battery compartment for receiving a battery, a processor, memory, a data screen for displaying alpha-numeric data, a micro-size keyboard for entering alpha-numeric data, a radio receiver for receiving data over air, and a radio transmitter for transmitting data over air. Accordingly, data may be transmitted from one pager and received by another by way of the network system. Likewise, data from a source external to the network system may be received by a pager, and such pager may transmit data to a destination external to the network system. In addition, such pagers typically include a serial port or the like by which data may be uploaded and/or downloaded, for example during pager initialization, set-up, and upgrade at a pager sales and/or service center.

Examples of pager network systems include the MOBITEX network designed and/or marketed by ERICSSON MOBILE COMMUNICATIONS AB of Sweden and the REFLEX network designed and/or marketed by MOTOROLA Corporation of Schaumberg, Ill., USA. Such network systems ("networks") typically include one or more base stations, where each base station has associated with it a plurality of geographically spaced base transmitters, each of which can potentially transmit the data received by the radio receiver of the pager, and a plurality of geographically spaced base receivers, each of which can potentially receive the data transmitted by the radio transmitter of the pager. The base transmitters and the base receivers are spread out over a network coverage area, and each is assigned particular transmitting or receiving frequencies by its respective base station.

As should be appreciated, each base station is responsible for directing pager data to its ultimate destination or from its ultimate source. Such base station also assigns the frequencies to the base transmitters and base receivers, keeps track of the locations of pagers with respect to base transmitters and base receivers, assigns each pager to a particular base transmitter and to a particular base receiver as the pager is moved through the network coverage area, or at least through the portion thereof that the base station is responsible for, and transmits information to each pager regarding the assigned base transmitter and assigned base receiver and/or frequencies thereof, among other things. Since the pager must acknowledge receipt for data verification purposes and the like, among other things, the pager must always be in two-way communication with the network, even if only receiving data from such network.

Typically, the base transmitters operate at a relatively high power, owing to the fact that each pager is battery-operated and the receiver therein operates at a relatively low power. Also owing to the fact that each pager is battery-powered and the transmitter therein likewise operates at a relatively low power, the base receivers are typically concentrated at a higher number per geographical area than the transmitter base stations in the network coverage area. Accordingly, it is statistically more likely that a pager is closer to a base receiver than to a base transmitter. Correspondingly, it is also more likely that a pager in a fringe (i.e., area on the edge) or marginal (i.e., an area with poor transmission quality) portion of the network coverage area can receive data from a base transmitter, but that a base receiver cannot receive data from such pager, owing to the relatively low transmitting power of such pager.

The network coverage area for a pager network is typically finite. For example, such network coverage area may roughly correspond to a state or region, a portion of a state or region, a metropolitan area, a metropolitan area extending over portions of several states or regions, or the like. Accordingly, through cooperative service agreements between networks, 'roaming' pager coverage may be provided for a pager outside the network coverage area of its 'home' network. With such cooperative service agreements, the over-all pager coverage area encompasses a large portion of urban areas in the United States, and many rural areas too. Inevitably, though, there are significant portions of the United States where pager coverage is not available. As should be appreciated, coverage for a pager is not available anywhere the pager cannot communicate with both a base receiver and a base transmitter to achieve the aforementioned two-way communications link. For example, coverage is not available in fringe or marginal portions of the network coverage area or the over-all pager coverage areas (if roaming coverage is provided), as was pointed out above, and in areas external to the network coverage area or the over-all pager coverage areas (if roaming coverage is provided). This is true even if the pager can communicate with a base transmitter. Of course, coverage will also not be available anywhere the pager cannot communicate with a base transmitter, but for the reasons specified above, it is more likely that loss of communication with any base receiver will occur first, or at least concurrently.

Equally inevitably, individuals with two-way pagers or the like visit areas where coverage is not available, both in and out of the United States, and such individuals would like some sort of continued two-way paging service even though in such areas without coverage. Accordingly, a need exists for a method and apparatus to provide coverage for a two-way pager or the like, especially when the pager is outside the aforementioned coverage area.

SUMMARY OF THE INVENTION

In the present invention, a portable communications device (PCD) such as a pager is coupled to a first network by way of a second network when the PCD is out of radio communication with the first network. The PCD leaves a first network mode and enters a second network mode. The PCD then establishes a network connection with the first network by way of the second network, and enters into communication with the first network by way of the second network.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
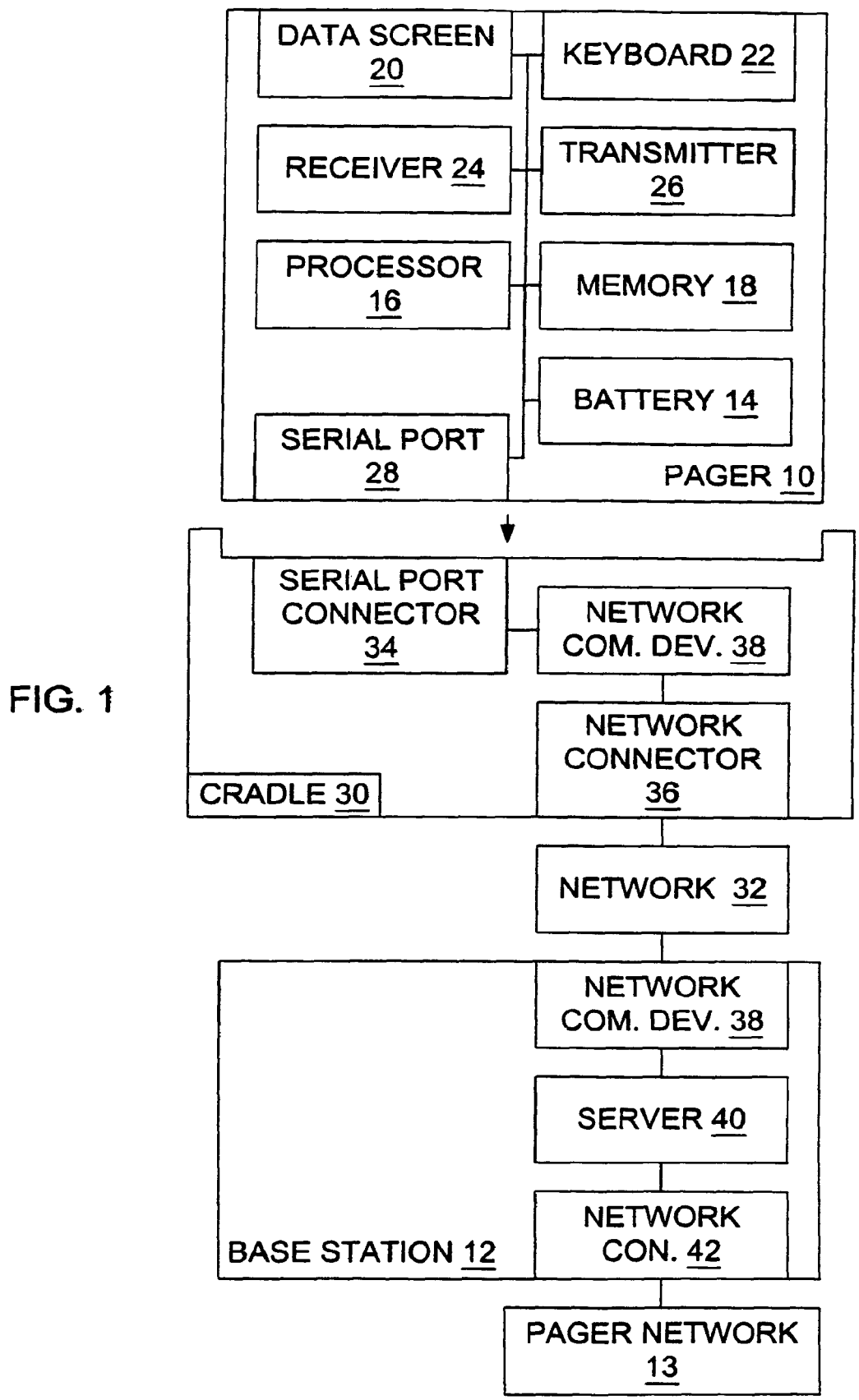
FIG. 1 is a block diagram showing a two-way pager or the like and a base station in accordance with one embodiment of the present invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The words "vertical" and "horizontal" in the present application designate orientations with respect to an object when such object is positioned in a particular and/or customary manner, but do not restrict the present invention to the object in such position. The terminology includes the words above specifically mentioned, derivatives thereof, and words of similar import.

Referring now to FIG. 1, a pager 10 or the like and a base station 12 or the like are shown in accordance with one embodiment of the present invention. As was discussed above, and as shown, a typical two-way pager 10 is intended to be in communication with a pager network 13 and may include a battery compartment for receiving a battery 14, a processor 16, memory 18, an output device such as a data screen 20 for displaying alpha-numeric data, an input device such as a micro-size keyboard 22 for entering alpha-numeric data, a radio receiver 24 for receiving data over air, and a radio transmitter 26 for transmitting data over air. Notably, any particular two-way pager 10 may be employed without departing from the spirit and scope of the present invention, and such pager 10 need not necessarily include all of the aforementioned elements 14-26, again without departing from the spirit and scope of the present invention. For example, such pager 10 need not necessarily have the keyboard 22 or the data screen 20, and could instead or in addition have a speaker and/or a microphone, a video and/or still camera and/or a video screen, and/or the like.

Importantly for purposes of the present invention, the pager 10 also includes an externally accessible serial port 28 or the like by which data may be uploaded and/or downloaded. As was discussed above, such serial port 28 has heretofore been employed for services such as pager initialization, set-up, and upgrade at a pager sales and/or service center. Nevertheless, the pager 10 is capable of interacting with a device in the field by way of such serial port 28.

In one embodiment of the present invention, and as seen in FIG. 1, when the pager 10 is in an area where coverage is not available, such pager 10 may be placed in a cradle 30 or the like and thereby establish contact with the base station 12 by way of a network 32 such as a public switched (i.e., land line) telephone network, a mobile switching (i.e., mobile or cellular) network, an external computing network such as the Internet, an internal computing network, and the like. The public switched telephone network or the mobile switching network are most likely preferred due to their availability even in many remote and even wilderness locations. Such public switched telephone network or the mobile switching network may also be employed to dial into the aforementioned internal or external computing networks.

Preferably, the cradle 30 includes a serial port connector 34 for coupling with the serial port 28 of the pager 10. As may be appreciated, the cradle 30 and the pager 10 may be constructed such that a positive connection between the serial port connector 34 and the serial port 28 is achieved merely by inserting such pager 10 into such cradle 30. For example, the cradle 30 and the pager 10 may include keying features for guiding and aligning such pager 10 and such cradle 30 during coupling to achieve such positive connection. Such keying features (not shown) may include but are not limited to complementary grooves and ridges, protrusions and recesses, and the like.

Also preferably, the cradle 30 includes a network connector 36 or the like for coupling the cradle 30 and by extension the pager 10 to the network 32. Of course, depending on the network 32, the network connector 36 will vary. For example, for the public switched telephone network, the network connector 36 is merely a telephone connector that receives a connector on one end of a telephone cord, where the other end is appropriately coupled to such network. For the mobile switching network, the network connector 36 may be a port that couples via an appropriate cable to a corresponding port on a mobile phone which in turn is registered on such network. Alternatively, the functional components of such mobile phone are integrated within such network connector 36. Other appropriate network connectors 36 may be employed based on the network 32 employed without departing from the spirit and scope of the present invention.

The cradle 30 further preferably includes a network communications device 38 for interfacing between the serial port connector 34 and the network connector 36. Of course, depending on the network 32, the network communications device 38 will vary. For example, for the public switched telephone network and the mobile switching network, the device 38 is an appropriately configured modem of a type that is typically employed for such purpose. For the internal or external computing network, the device 38 is an appropriately configured network interface such as a network interface card. Other appropriate network communications devices 38 may be employed based on the network 32 employed without departing from the spirit and scope of the present invention. In any instance, the device 38 receives data from the pager 10 by way of the serial port 28 thereof and sends such data to the network 32, and also receives data from the network 32 and sends such data to the pager 10 by way of the serial port 28 thereof.

The cradle 30 may have its own power source, such as a battery or an AC power converter, and/or may derive its power from the received pager 10. Of course, if power use is more than minimal, it may be preferable that the cradle 30 have its own power source so as not to excessively draw down the battery of such pager 10. If the cradle 30 has its own power source, such cradle 30 may supply additional power to the pager 10 so as to conserve the battery of such pager 10 and/or provide a power boost to the pager 10.

The base station 12 is a traditional base station in the sense that it performs all the normal base station functions with regard to directing data to and from the pager 10. However, in one embodiment of the present invention, such base station 12 is a non-traditional base station in that it does not have any associated base transmitters or base receivers, and therefore need not concern itself with frequency assignment, pager tracking, pager assignment, and the like. Instead, such base station 12 is a dedicated base station solely for servicing pagers 10 through the network 32. Accordingly, the base station 12 is coupled to and is a portal between the network 32 and the pager network 13 or the like. In such an instance, the base station 12 may include a server 40 coupled to the network 32 and to the pager network 13 and programmed to emulate all necessary two-way base station functions. Of course, to couple to the network 32, the base station 12 may also have a network communications device 38 similar to the network communications device 38 in the cradle 30 (e.g., a modem). Moreover, to couple to multiple cradled pagers 10 by way of the network 32, multiple network communications devices 38 may be employed if necessary. To couple to the pager network 13, an appropriate network connection 42 may be employed. The details of the couplings, the connections, and the emulation are generally known and therefore need not be described herein in further detail. Of course, the base station 12 may in fact be a non-dedicated base station that directs data from both the network 32 and traditional base transmitters and base receivers without departing from the spirit and scope of the present invention.

Figure 3:
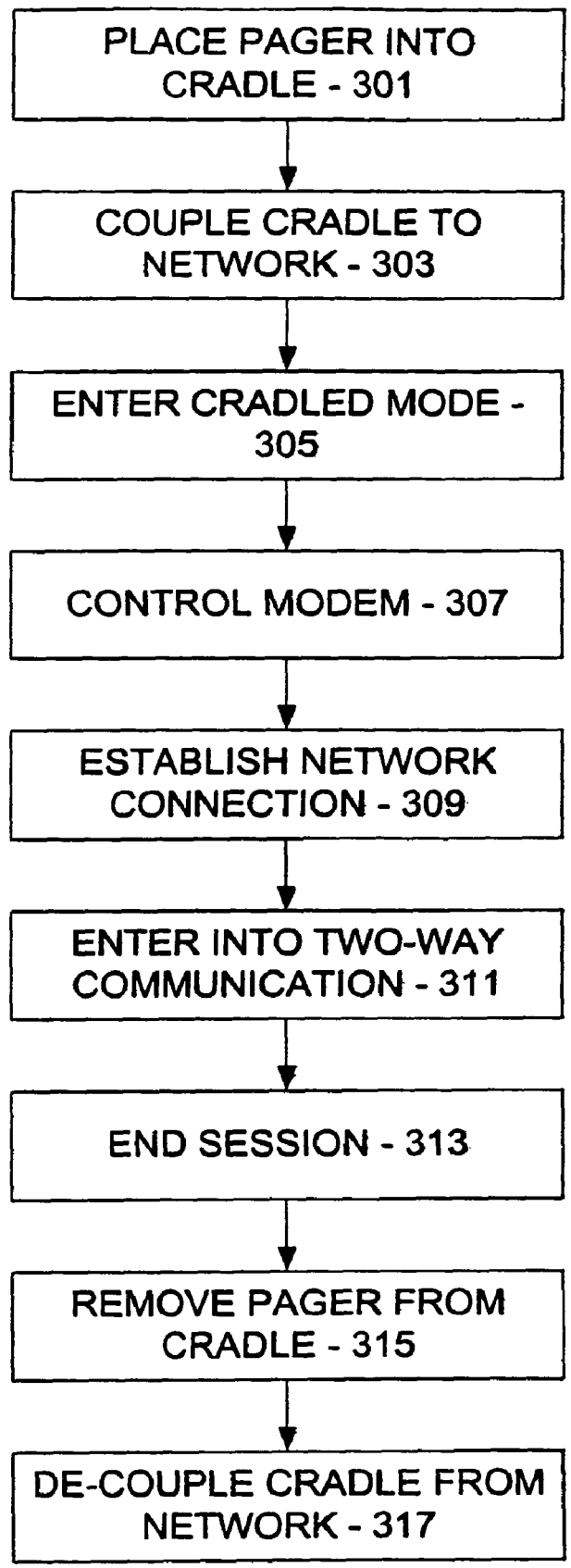
FIG. 3 is a flow chart depicting steps employed with the two-way pager and the base station of FIGS. 1 and 2 in accordance with one embodiment of the present invention.

In operation, and referring now to FIG. 3, when two-way operation of the pager 10 is disrupted because such pager 10 is out of range or is otherwise unable to contact its pager network 13, the user thereof appropriately places such pager 10 into the cradle 30 (step 301) so that the serial port 28 of the pager 10 is coupled with the serial port connector 34 of the cradle 30. In addition, such user appropriately couples the cradle 30 to the network 32 by way of the network connector 36 (step 303) and whatever appropriate coupling is necessary (a telephone cable, for example, in the case of a public switched telephone network).

Preferably, the pager 10 and the processor 16 therein are programmed to sense the connection to the cradle 30, and thereby enter a 'cradled' mode (step 305) where the radio transmitter 26 and radio receiver 24 therein are not employed. Instead, in such 'cradled' mode, the pager 10 and the processor 16 therein preferably gain the attention of and establish control over the network communications device 38 (e.g., the modem) (step 307) within the cradle. Alternatively, the user may desire or be required to positively command the pager 10 to enter the cradled mode. Thereafter, the pager 10 and the processor 16 therein employ the network communications device 38 to establish a network connection with the base station 12 by way of the network 32 (step 309), and then the pager 10 and processor 16 therein enter into two-way communication with the base station 12 by way of the network 32 (step 311) to send and receive pager information.

Preferably, during the time when two-way operation of the pager 10 is disrupted because such pager 10 is out of range or is otherwise unable to contact its pager network 13, and before the pager 10 enters into two-way communication with the base station 12, any outgoing data from the pager 10 (such as outgoing messages and other outgoing information) is held in the memory 18 of the pager, and any incoming data destined for the pager 10 (such as incoming messages and other incoming information) is held in an appropriate memory location of the pager network 13. Accordingly, upon establishing two-way communication between the pager 10 and the base station 12 by way of the network 32, such incoming and outgoing data is released and exchanged therebetween. Moreover, upon establishing two-way communication between the pager 10 and the pager network 13 by way of the base station 12 and the network 32, additional incoming and outgoing data (such as new messages and other information) may be composed and exchanged therebetween.

When the user wishes to end the session, such user may command the pager 10 to do so (step 313). The pager may also automatically end the session after a pre-determined period of in-activity, among other things. The user can then remove the pager 10 from the cradle 30 (step 315) and de-couple the cradle 30 from the network 32 by way of the network connector 36 (step 317). Preferably, upon sensing removal from the cradle 30, the pager 10 returns to a 'normal' mode. Alternatively, the user positively commands the pager 10 to return to normal mode. In one embodiment of the present invention, the user can leave the pager 10 in the cradle 30 and allow the pager 10 to automatically make a connection to the base station 12 by way of the network 32 on a periodic or predetermined basis.

Even if coverage is available for the pager 10 in the normal mode by way of the pager network 13, such pager 10 may still be placed in cradled mode to establish two-way communication between the pager 10 and the base station 12 by way of the network 32 without departing from the spirit and scope of the present invention. Reasons for doing so may include anticipation of more reliable two-way communication, and availability of higher data transmission speeds, among other things, as well as user choice or preference.

In a variation on the embodiment of the present invention shown in FIG. 1, the actual structure of the cradle 30 is dispensed with, and the pager 10 or the like is coupled directly to the network communications device 38. Such direct coupling may for example be achieved by way of a serial port connector 34 at the end of a cable which is appropriately attached to such network communications device 38.

Figure 2:
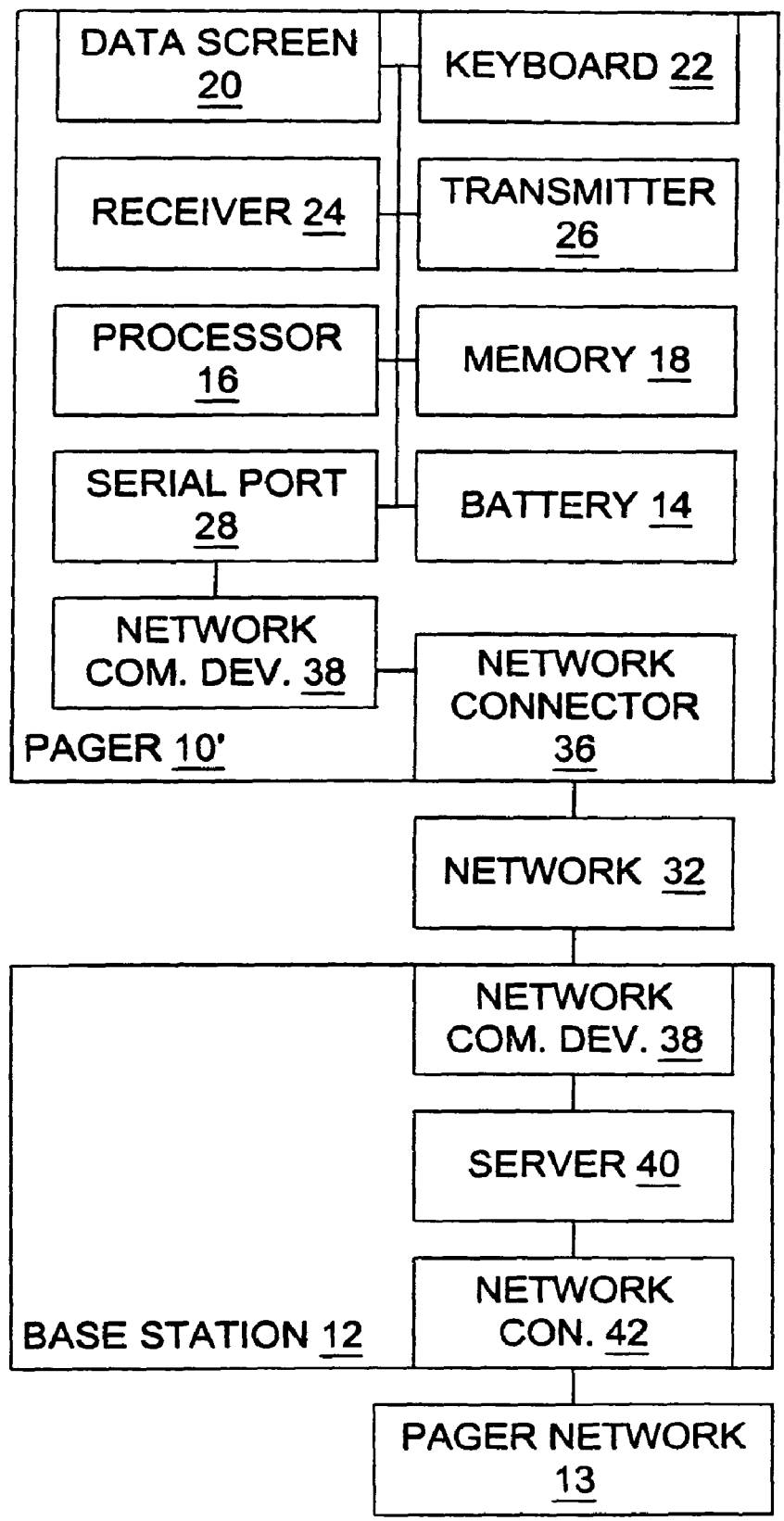
FIG. 2 is a block diagram showing the two-way pager or the like and the base station of FIG. 1 in accordance with another embodiment of the present invention.

In another embodiment of the present invention, and referring now to FIG. 2, the cradle 30 of FIG. 1 is omitted, but the necessary contents and/or functionality therein are re-located to the pager 10', as is shown. Thus, the serial port connector 34 of FIG. 1 is no longer necessary, as the network communications device 38 and the connection between such network communications device 38 and the serial port 28 of the pager 10' are internal to such pager 10'. The network communications device 38 (e.g., a modem) may thus comprise a chip set within the pager 10', or the processor 16 of the pager 10' may be programmed with the functionality of such device 38. The network connector 36 is still necessary but is now mounted directly to the pager 10' by appropriate means. Preferably, the network connector 36 is a micro-size connector to conserve space, and may for example be of a type that 'flips out' from the pager 10' in a known manner.

In operation, the non-cradled pager 10' of FIG. 2 by definition cannot automatically sense a connection to any cradle 30. Accordingly, such pager 10' must be positively commanded to enter 'cradled' mode, or must automatically sense a connection to the network connector 36 to enter 'cradled' mode. Likewise, such pager 10' must be positively commanded to enter 'normal' mode, or must automatically sense a disconnection from the network connector 36 to enter 'normal' mode. Otherwise, the steps shown in FIG. 3 are performed in substantially the same manner.

Of course, the present invention also encompasses the use of two-way networked data communications devices and portable communications devices other than the pager 10. Similarly, the present invention encompasses the use of one-way pagers 10 and other similar devices. Likewise, the data from and to the pager 10 or the like may be directed by devices other than a base station 12, emulated or otherwise.

The programming necessary to effectuate the present invention, such as the programming run by the processor 16 of the pager 10 and the programming run by the server 40 of the base station, is known or is readily apparent to the relevant public. Accordingly, further details as to the specifics of such programming is not believed to be necessary herein.

As should now be understood, in the present invention, a method and apparatus are provided to support coverage for a two-way pager or the like, especially when the pager is outside the coverage area of its pager network. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

The invention claimed is:

1. A portable communications device (PCD) for connecting to a pager network by way of a second network, the PCD normally in radio communication with the pager network, the PCD connecting to the first network by way of the second network, the PCD comprising:
   a processor;
   a memory in communication with the processor;
   a first network communication device in communication with the processor;
   a first network connector coupled to the first network communication device, the first network connector for connecting to the second network;
   a second network communication device in communication with the first network communication device via the second network;
   a second network connector coupled to the second network communication device, the second network connector for communication with the pager network;
   wherein the second network communication device relays communication between the first network communication device and the pager network through the second network.

2. The PCD of claim 1, wherein the first network communication device is a cellular transceiver.

3. The PCD of claim 2, wherein the first network communication device maintains radio communication with at least one of the pager and second network.

4. The PCD of claim 1, wherein the second network communication device is a modem.

5. The PCD of claim 4, wherein the second network communication device is in communication with a public switched telephone network.

6. The PCD of claim 1, further comprising a video screen.

7. The PCD of claim 1, further comprising a microphone and a speaker.

8. A system for connecting a portable communications device (PCD) to a pager network by way of a second network, the PCD normally in radio communication with the pager network, the PCD connecting to the pager network by way of the second network, the system comprising:
   a portable communications device;
   a cradle coupled to the PCD;
   a first network connector coupled to the cradle, the first network connector for connecting to the second network;
   a second network communication device in communication with the cradle via the second network; and
   a second network connector coupled to the second network communication device, the second network connector for communication with the pager network;
   wherein the second network communication device relays communication between the PCD and the pager network through the second network.

9. The system of claim 8, wherein the first network connector is a cellular transceiver.

10. The system of claim 9, wherein the first network connector maintains radio communication with at least one of the pager and second network.

11. The system of claim 8, wherein the second network communication device is a modem.

12. The system of claim 11, wherein the second network communication device is in communication with a public switched telephone network.

13. The system of claim 8, wherein the PCD is a pager device.

14. The system of claim 8, wherein the PCD determines that the PCD is out of communication with the pager network.

15. The system of claim 8, wherein the PCD determines that communication between the PCD and the pager network is degraded.

16. The system of claim 8, wherein the pager network is a cellular telephone network.

17. The system of claim 8, wherein the second network is a digital network.

* * * * *